United States Patent [19]
Ballard et al.

[11] Patent Number: 5,456,973
[45] Date of Patent: Oct. 10, 1995

[54] MONOFILAMENTS FROM POLYMER BLENDS AND FABRICS THEREOF

[75] Inventors: Larry E. Ballard; Michelle Diaz-Kotti; Robert A. Keller, all of Columbia, S.C.

[73] Assignee: Shakespeare Company, Columbia, S.C.

[21] Appl. No.: 378,569

[22] Filed: Jan. 26, 1995

Related U.S. Application Data

[62] Division of Ser. No. 225,657, Apr. 11, 1994.

[51] Int. Cl.[6] .................................................. D02G 3/00
[52] U.S. Cl. .......................... 428/224; 428/357; 428/373
[58] Field of Search ........................... 428/224, 357, 428/373; 525/437; 139/383 A

[56] References Cited

U.S. PATENT DOCUMENTS

| | | | |
|---|---|---|---|
| 3,471,587 | 10/1969 | Wittemore et al. | 260/823 |
| 4,021,596 | 5/1977 | Bailey | 428/375 |
| 4,060,514 | 11/1977 | White | 260/47 ET |
| 4,140,671 | 2/1979 | Cohen | 270/40 R |
| 4,251,429 | 2/1981 | Salee | 260/40 R |
| 4,276,397 | 6/1981 | Froix | 525/448 |
| 4,284,549 | 8/1981 | Salee | 260/40 R |
| 4,305,862 | 12/1981 | Salee | 260/40 R |
| 4,334,050 | 6/1982 | White | 525/390 |
| 4,610,916 | 9/1986 | Ballard | 428/224 |
| 4,689,365 | 8/1987 | Chacko et al. | 524/539 |
| 4,748,077 | 5/1988 | Skinner et al. | 428/224 |
| 4,755,420 | 7/1988 | Baker et al. | 428/222 |
| 4,997,866 | 3/1991 | Nakata et al. | 523/512 |
| 5,162,151 | 11/1992 | Smith et al. | 428/364 |
| 5,169,499 | 12/1992 | Eagles et al. | 428/175 |
| 5,218,043 | 6/1993 | Kubota et al. | 524/609 |
| 5,246,992 | 9/1993 | Wick et al. | 524/195 |

*Primary Examiner*—N. Edwards
*Attorney, Agent, or Firm*—Renner, Kenner, Greive, Bobak, Taylor & Weber

[57] ABSTRACT

A monofilament which exhibits improved hydrolytic stability properties as compared to conventional polyester monofilaments is formed from the extrusion of a blend of PPS and at least one polymer selected from the group consisting of PET, a high temperature polyester resin and polyphenylene oxide and possibly, a hydrolytic stabilizing agent. The monofilament is produced without the inclusion of compatibilizers or fillers, even though PPS is known to be incompatible with PET and high temperature polyester resins in most applications. A fabric may be produced having increased resistance to hydrolytic degradation and includes a plurality of woven monofilaments, comprising a blend of PPS with at least one other polymer selected from the group consisting of PET, a high temperature polyester resin and polyphenylene oxide and, a hydrolytic stabilizing agent. Such fabrics have utility as fabrics for the dryer sections of paper machines. Methods for the production of such monofilaments are also provided.

21 Claims, No Drawings

5,456,973

MONOFILAMENTS FROM POLYMER BLENDS AND FABRICS THEREOF

This application is a division of application Ser. No. 08/225,657, filed Apr. 11, 1994.

TECHNICAL FIELD

The present invention relates to extruded monofilaments which, for example, may be useful as a component or fabrics for paper machines. More particularly, the present invention relates to monofilament comprising a blend of polyphenylene sulfide (PPS) and at least one other polymer selected from the group consisting of polyethylene terephthalate (PET) and high temperature polyester resins, such as cyclohexandimethylene terephthalate/isophthalate (PCTA) or cyclohexandimethylene terephthalate (PCT), and polyphenylene oxide (PPO). All of these monofilaments have improved thermal, hydrolytic and chemical resistance compared to conventional PET and high temperature polyester monofilaments.

BACKGROUND OF THE INVENTION

Polyethylene terephthalate (PET), an aliphatic/aromatic polymer, is a well known thermoplastic material commonly used in the production of filaments for a variety of applications. Because of its excellent mechanical and fiber-forming properties such as tensile strength and loop strength, PET is especially useful in industrial applications such as for the production of fabrics for filtration and the reinforcement of various structures. Moreover, the monofilaments produced from PET are frequently woven into support belts or fabrics for transporting and dewatering paper sheets on paper machines.

However, this application, as many other applications for which PET monofilaments are suited, provides a rather harsh environment which often subjects the PET to high temperatures and harsh chemicals including hot water, chemicals having a high pH and so forth. When exposed to wet or dry high temperature conditions and/or to harsh chemical environments for significant periods of time, the PET filaments are known to degrade. Unfortunately, while stabilizing additives and stabilization techniques can be employed to extend the useful life of the PET, such additives and methods prolong the life of the PET filaments for only a relatively short period of time, and the PET filaments are eventually degraded under the conditions described hereinabove. Thus, because of its susceptibility to thermal, hydrolytic and other chemical degradation, the usefulness of PET filaments is particularly limited.

Similarly, polyphenylene sulfide (PPS) is a thermoplastic polymer which is also known to have use in the production of filaments and monofilaments for a variety of applications. In contrast to PET filaments however, PPS filaments have excellent thermal, hydrolytic and chemical resistance properties and therefore, may be particularly useful for the production of monofilaments for woven fabrics which are exposed to high temperatures and harsh chemical environments. Unfortunately, the useful applications for these PPS filaments are somewhat limited due to the relatively high cost of the material and its relatively poor mechanical properties. More particularly, PPS tends to be brittle. Notably, the tensile strength of PPS is generally about one-half that of PET, while the loop strength of PPS is about 50 percent lower than that of PET. This lower tensile strength and loop strength has been known to create processing problems when PPS filaments are woven into fabrics. Accordingly, a need exists for a monofilament which provides at least some of the excellent physical properties of conventional PET monofilaments, but which will have longer life in wet or dry environments at high temperatures or in environments with harsh chemicals than will filaments of conventional PET.

PPS has been blended with PET and with various other polymers as described in the following patents although monofilaments of PPS/PET blends have not been known heretofore. For example, in Salee U.S. Pat. Nos. 4,251,420 and 4,284,549, PPS was blended with a polymer prepared from an aromatic dicarboxylic acid and a bisphenol in order to enhance the hydrolytic stability of the blend. More particularly, the polymer was prepared by reacting bisphenol A with isophthaloyl chloride and terephthaloyl chloride to obtain a linear fully aromatic polymer. The resultant blend is unsuitable for filament extrusion however, in view of the blending process employed and the tensile strength of the molded product. Specifically, the blend was prepared by tumble blending the linear aromatic polymer with the PPS for up to one hour and subsequently milling at about 249° C. (480° F.). The step of blending was carried out before the step of molding. In addition, the tensile strength of the materials molded from the polymer blend is about 10,000 psi, approximately a factor of 10 less than the desired tensile strength of monofilaments suitable for use in most applications.

Similarly, in Salee U.S. Pat. No. 4,305,862, PPS was blended with fully aromatic polymers prepared from a aromatic dicarboxylic acid and a bisphenol. This blend was used to produce molded products and to prepare materials with improved dielectric strength. The resin blend and the blending process are unsuitable for extrusion of monofilaments, however.

In addition, Froix U.S. Pat. No. 4,276,397 relates to blends of PPS and fully aromatic polymers which blends were again used for molding products. Notably, the tensile strength of the molded products ranges from about 8400 psi to about 16,000 psi, again far less than the desired tensile strength of monofilaments. Additionally, the elongation of the products was less than 3 percent. Accordingly, these blends would be unsuitable for extruding filaments.

Still further, Cohen U.S. Pat. No. 4,140,671 discloses blends of PPS and polybutylene terephthalate (PBT) with glass fibers. This blend also contains flame retardants and talc. While the blends in Cohen are noted as being produced by extrusion, they are used for molding products, not monofilaments. In fact, the tensile strength of the molded products in Cohen is about 8,000 psi to 14,000 psi, again well below to desired tensile strength for monofilaments. Moreover, because of the glass fibers and talc in the blend, it could not be used for fibers or filaments.

Some blends of PPS with other polymers have been used to produce filaments; however, the mechanical properties of the filaments formed were not significantly improved. For example, Baker et al. U.S. Pat. No. 4,755,420 discloses filaments made from blends of PPS and nylon 66. It was found that the brittleness of the PPS was reduced by the addition of 6 percent nylon 66. However, as the level of nylon 66 increased, abrasion resistance of the filament was decreased even though toughness increased.

In Ballard U.S. Pat. No. 4,610,916, filaments from blends of PPS and ethylenetetrafluoroethylene (ETFE) were disclosed. Again, the brittleness of the PPS was significantly reduced, as shown by the increase in the loop strength of the material; however, tensile and knot strength of the PPS were not significantly improved, even with increased levels of ETFE.

Still further, Skinner et al. U.S. Pat. No. 4,748,077 discloses filaments made of blends of PPS with polyethylene, polypropylene, polyethylene/propylene copolymers, polymetaxylylene adipamide and polyvinylidene fluoride. However, it is noted that increased levels of these materials in PPS did not improve the physical properties of the filaments.

In Smith U.S. Pat. No. 5,162,151, filaments made from blends of PPS with vinylidene fluoride/hexafluoropropylene copolymer were disclosed. This copolymer also did not improve the mechanical properties of the filaments.

Notwithstanding the above patents, attempts have been made to blend PPS and PET in order to improve the mechanical properties of PPS or the thermal and chemical resistance properties of PET in molding applications. However, because PPS and PET are not fully compatible, all of these attempts have met with unsatisfactory results unless a compatibilizing polymer or reinforcing filler was added to the blend. In fact, at least two patents expressly indicate that blends of PPS and PET must be formed using various compatibilizing agents, and even when such compatibilizing agents are employed, the formation of useful blends of PPS and PET requires extraordinary effort. Notably, the blends were prepared by kneading or by the use of a twin screw extruder.

In Nakata U.S. Pat. No. 4,997,866, PPS was blended with PET, PBT and polycyclohexanedimethyl terephthalate (PCT) to again produce molded products, not monofilaments. However, as noted therein, physical blends of these polyester resins with PPS were found to be unsatisfactory because of problems with compatibility. In order to prepare satisfactory blends for use in the molded products being produced, it was necessary to use compatibilizing agents such as unsaturated polymers. As shown in Examples 4, 5 and 6 (Table 2) of the Nakata patent, a blend of PPS and PET devoid of compatibilizers was determined to be unsatisfactory.

In Kubota U.S. Pat. No. 5,218,043, blends of PPS with PBT and PET were disclosed. Again, as noted therein, blends of PPS with these polymers were found to be unsatisfactory for molding applications because of poor resin compatibility. In order to prepare satisfactory blends for molding, it was necessary again to use compatibilizers such as vinyl or allyl compounds containing an epoxy group. Moreover, blends without these compatibilizers were found to have unsatisfactory mechanical and physical properties.

Finally, when compatibilizers are not utilized, fillers or reinforcing fibers are necessary to provide sufficient strength to the products being molded. For instance, Chacko U.S. Pat. No. 4,689,365 discloses blends prepared from PPS and polybutylene terephthalate, nucleated PET or mixtures thereof as well as reinforcing fibers. Notably, the blends were prepared by first extruding the components and then molding the blend into a product. Unfortunately, this blend cannot be used for the extrusion of monofilaments because of the addition of glass fiber and other types of reinforcing fillers. The two-step blending process (blending and then molding) is also unsuitable for extrusion of monofilaments.

Thus, it will be appreciated that no attempts have been made to blend PPS with PET, or high temperature polyesters, with or without compatibilizers, in order to produce extruded filaments having at the same time thermal, hydrolytic and chemical resistance superior to filaments of PET, or high temperature polyesters, and physical properties superior to filaments of PPS. That is, heretofore, monofilaments have been produced which comprise only PPS or only polyester, not a blend of the polymers. Of course, some of these monofilaments included additives to stabilize and otherwise strengthen the monofilaments, but none used a blend of PPS and PET and/or high temperature polyesters. Because of the brittleness and relatively poor fiber-forming properties of PPS and the lower thermal, hydrolytic and chemical resistance properties of PET or high temperature polyesters, these "pure" PPS or "pure" PET or high temperature polyester monofilaments are limited in their applications and may not be suitable for demanding fabric designs and/or environment where high temperature and harsh chemicals may be present.

Accordingly, the production of an extruded monofilament comprising a blend of PPS and PET and/or high temperature polyester which has improved mechanical properties over conventional PPS monofilaments and improved thermal, hydrolytic, and chemical resistance properties over conventional PET or high temperature polyester monofilaments is highly desirable, and such a monofilament with these useful and superior properties would be highly unexpected, especially in view of the teachings of Nakata U.S. Pat. No. 4,997,866 and Kubota U.S. Pat. No. 5,218,043 which indicated that such useful properties could not be obtained from PPS/PET blends.

it should also be noted that high temperature polyester resins, having a melting point above about 260° C., have been round to be suitable for use in monofilaments for paper machine fabrics. Such high temperature polyester resins include, but are not limited to poly-(cyclohexanedimethylene terephthalate) and poly(cyclohexanedimethylene terephthalate/isophthalate). The use of poly(1,4-cyclohexanedimethylene terephthalate/isophthalate) and its suitability for use in paper machine fabrics is essentially described in Eagles U.S. Pat. No. 5,169,499. It is referred to as poly(1,4-cyclohexanecarbinyl terephthalate) in this patent. Specifically, the Eagles patent discloses the use of a resin comprising carboxyl groups which are hindered by a moiety selected from cyclic aliphatic and branched aliphatic glycols and is noted as having excellent hydrolytic stability. However, this high temperature polyester resin has lower dry heat (thermal) stability as compared to conventionally stabilized PET.

Notwithstanding these improvements, a need still exists, as a result of the deleterious conditions which paper machine fabrics are subject to during the paper making process, for resin blends which may produce suitable monofilaments having improved resistance to hydrolytic, thermal and chemical degradation.

SUMMARY OF INVENTION

It is, therefore, an object of the present invention to provide a monofilament having useful hydrolytic, thermal, chemical and physical properties comprising a blend or PPS and PET.

It is, therefore, an object of the present invention to provide a monofilament having useful hydrolytic, thermal, chemical and physical properties comprising a blend or PPS and a high temperature polyester resin.

It is, therefore, an object or the present invention to provide a monofilament having useful hydrolytic, thermal, chemical and physical properties comprising a blend of PPS, PET and a high temperature polyester resin.

It is, therefore, an object of the present invention to provide a monofilament having useful hydrolytic, thermal, chemical and physical properties comprising a blend of PPS and PPO.

It is another object of the present invention to provide monofilaments, as above, having a tenacity of at least about 2.7 grams/denier.

It is yet another object of the present invention to provide a fabric at least partially woven from monofilaments formed by a blend of PPS and PET.

It is yet another object of file present invention to provide a fabric at least partially woven from monofilaments formed by a blend of PPS and a high temperature polyester resin.

It is yet another object of the present invention to provide a fabric at least partially woven from monofilaments formed by a blend of PPS, PET and a high temperature polyester resin.

It is yet another object of file present invention to provide a fabric at least partially woven from monofilaments formed by a blend of PPS and PPO.

It is still a further object to provide methods for forming monofilaments comprising a blend of PPS with at least one other polymer selected from the group consisting of PET, a high temperature polyester resin and PPO.

At least one or more of the foregoing objects, together with the advantages thereof over the known art relating to monofilaments and fabrics woven therefrom, which shall become apparent from the specification which follows, are accomplished by the invention as hereinafter described and claimed.

In general, the present invention provides a monofilament comprising a polymer blend of polyphenylene sulfide with at least one other polymer selected from the group consisting of polyethylene terephthalate, a high temperature polyester resin and PPO.

The present invention also provides a fabric for use in paper machines and like comprising a plurality of woven monofilaments, the monofilaments comprising a blend of polyphenylene sulfide with at least one other polymer selected from the group consisting of polyethylene terephthalate, a high temperature polyester resin and PPO.

The present invention also provides a method for forming monofilaments comprising the steps of simultaneously blending and extruding polyphenylene sulfide with at least one other polymer selected from the group consisting of polyethylene terephthalate, a high temperature polyester resin and PPO. Alternatively, the method may include the steps of dry blending the PPS with at least one of the other polymers and extruding the blend to form the monofilament.

PREFERRED EMBODIMENT FOR CARRYING OUT THE INVENTION

The present invention is directed toward a monofilament comprising a blend of polyphenylene sulfide (PPS) and at least one other polymer selected from the group consisting of polyethylene terephthalate (PET) and a high temperature polyester resin (PCTA or PCT) and polyphenylene oxide (PPO). The monofilament has improved thermal, hydrolytic and chemical resistance properties as compared to conventional PET monofilament and to high temperature polyester monofilaments. Significantly, the monofilament maintains these useful and superior properties even though PPS, PET, a high temperature polyester resin and PPO are not fully compatible. That is, the monofilaments of the present invention may be devoid of compatibilities and/or reinforcing fibers and fillers.

As noted hereinabove, PPS exhibits excellent high-temperature stability and chemical resistance, which makes it ideal for use in high pH, high temperature applications in harsh environments. However, the tensile strength and loop strength of this polymer is relatively poor when formed into a monofilament. Additionally, the PPS material to be utilized in the present invention must be melt extrudable and therefore, will have a melt temperature range of between about 275° C. and 325° C. and have excellent flame resistant properties as well. Examples of PPS which may be suitable for use in the present invention include PPS material available from Hoechst Celanese under the trade name identification FORTRON and PPS material available from Phillips Chemical Co. under the trademark RYTON.

In contrast, as noted hereinabove, PET exhibits excellent mechanical properties such as high tensile strength and loop strength, but is relatively susceptible to wet or dry high temperature environments and to harsh chemical environments. PET is, however, useful in the production of monofilaments and is typically produced from ethylene glycol by direct esterification or by catalyzed ester exchange between ethylene glycol and dimethyl terephthalate. Other processes for producing PET may also be available and well known in the art. In addition, PET generally exhibits a melt temperature range between about 255° C. and 260° C.

One particularly useful PET suitable for use in the present invention is a standard PET available from E.I. du Pont de Nemours & Co. under the trademark CRYSTAR. This particular PET is produced in pellet form and has a melt temperature of about 257° C. and an intrinsic viscosity of about 0.95. It is to be understood that practice of the present invention is not to be limited to this particular PET because, in fact, PET having an intrinsic viscosity of from about 0.62 to 1.05 is believed to be suitable.

Any high temperature polyester resin known in the art and suitable for the conditions presented herein may be utilized in the blend composition of the present invention. By the term "high temperature", it is meant that the polyester resins employed have a melting point greater than 260° C. Thus, the high temperature polyester resins may include copolyester resins as well as homopolymer polyester resins. Typically such copolyester resins are formed by the reaction of at least two bifunctional acids with at least one bifunctional alcohol, or by the reaction of at least two bifunctional alcohols with at least one bifunctional acid. Homopolymer polyester resins are typically formed by the reaction of one bifunctional acid and one bifunctional alcohol. In other words, the high temperature polyester resins employed in the present invention are those polyesters whose synthesis uses one or more glycols and/or one or more dibasic acids. Preferably, the bifunctional acids include terephthalic and/or isophthalic acid, and the bifunctional alcohols include ethylene glycol and/or cyclohexanedimethanol.

One example of a high temperature polyester resin useful in the present invention is a copolyester produced by the Eastman Kodak Company under the trade names KODAR THERMX Copolyester 13319 or KODAR THERMX Copolyester 6761. Both names are used to identify the same resin. KODAR is a registered trademark of Eastman Kodak Co. for a thermoplastic copolyester resin. This polyester resin is commonly known as PCTA copolyester and is believed to have a melt temperature of about 285° C. That is, this polymer is a copolymer of cyclohexanedimethanol and terephthalic acid with isophthalic acid substituted for a portion of the terephthalic acid. The chemical name for this copolyester is poly(1,4-cyclohexanecarbinyl terephthalate) or poly(cyclohexanedimethylene terephthalate/isophthalate). This high temperature polyester resin is often used in the production of food trays for microwave and conventional ovens.

Other high temperature polyester resins preferably include poly(cyclohexanedimethylene terephthalate), also known as PCT polyester, which is also available from Eastman Kodak Co. under the trade names EASTMAN PCT 3879, PCT 10820, and/or PCT 1:3787. The PCT polyester is believed to have a melting temperature of about 292° C.

It has been found that these high temperature polyester resins may also be melt-extruded to form monofilaments which exhibit increased resistance to hydrolytic degradation as compared to conventional monofilaments of stabilized PET. However, the high temperature polyester resins are not as thermally stable as PET. in light of this lower thermal stability, the high temperature polyester resin may or may not include a thermal stabilizing agent. The thermal stabilizing agent is typically blended with the high temperature polyester resin prior to the addition of any of the other resins or stabilizers employed inter present invention. Examples of such suitable thermal stabilizing agents include antioxidants such as those found in Tenite P2950-77A, a 99 percent Tenite polypropylene with 1 percent blend of titanium dioxide and a proprietary antioxidant, produced by and a registered trademark of Eastman Chemical Products, Inc.; Thermx 1:3:319-L0001, a proprietary chemical composition believed to be an antioxidant compounded with the KODAR THERMX Copolyester 13319 resin; and Irganox® 1330, a hindered phenol produced by and a registered trademark of Ciba Geigy, Inc. Preferably, from 0 to about 5 percent by weight of such an additive may be blended with the high temperature polyester resin with a corresponding decrease in the amount of high temperature polyester resin used in the present monofilament.

Polyphenylene oxide (PPO) exhibits excellent high-temperature stability and chemical resistance, which also makes it ideal for use in high pH, high temperature applications in harsh environments. Additionally, the PPO material to be utilized in the present invention must be melt extrudable and therefore, will have a melt temperature range of between about 275° C. and 325° C. and have excellent flame resistant properties as well.

The monofilaments of the present invention are produced by simultaneously melt extruding the PPS resin and at least one other polymer selected from the group consisting of PET, a high temperature polyester resin and PPO, in the same extruder. The PPS, PET and a high temperature polyester resin materials may be blended prior to extrusion by tumbling. That is, the PPS, PET and a high temperature polyester resin materials may be dry blended via a conventional tumbling process so as to mix the pellets of material and can then be loaded and fed into the extruder. Alternatively, the polymer resins may be blended and extruded in one continuous step. Such a blending and extruding technique could involve a volumetric blender having two or more hoppers which feed the two or more polymer resins into the extruder independently. When such a blender is employed, the feed rates of each polymer resin can be adjusted so that the ratio of the polymer resins can be controlled. An example of such a blender is manufactured by Comet Automation Systems, Inc. of Dayton, Ohio.

For the blend comprising PPS and PET, from about 50 to 80 percent by weight PPS is blended with from about 20 to 50 percent by weight PET to form 100 percent by weight of the polymer blend. These ranges are preferred because it has been found that the abrasion resistance of these filaments will not decrease when up to about 50 percent by weight PET is employed in the polymer blend. The amount of PET is significantly higher than previous blends of PPS and PET, even though the previous resin blends incorporated compatibilizers or fillers. Moreover, this higher level of PET results in better mechanical properties for the filaments produced while at the same time substantially improving the chemical resistance of the filaments over that of 100 percent PET materials. That PET could be blended at such high levels with PPS while retaining mechanical properties as well as hydrolytic and chemical resistance was totally unanticipated.

For the blend comprising PPS and a high temperature polyester resin, from about 40 to 80 percent by weight PPS is blended with from about 20 to 60 percent by weight a high temperature polyester resin to form 100 percent by weight of the polymer blend. These ranges are preferred because it has been found that filaments comprising blends of PPS and high temperature polyester resins exhibit improved abrasion compared to 100 percent PPS or 100 percent a high temperature polyester monofilaments. The monofilaments produced from the blends also exhibit improved hydrolytic stability compared to monofilaments produced from 100 percent high temperature polyester material.

For the blend comprising PPS and PPO, from about 5 to 60 percent by weight PPS is blended with from about 95 to 40 percent by weight PPO to form 100 percent by weight of the polymer blend. These ranges are preferred because it has been found that the physical, chemical, hydrolytic and thermal properties can be designed to meet specific applications by varying the composition.

Furthermore, the polymer blends of the present invention can optionally include a hydrolytic stabilizing agent. Most hydrolytic stabilizing agents are carbodiimides. Preferably, carbodiimides can be selected from the group consisting of bis-carbodiimides corresponding to the formulae R—N=C=N—R and R—N=C=N—R' wherein R and R' are radicals selected from the group consisting of $C_4$–$C_{20}$ substituted and unsubstituted alkyl radicals, substituted and unsubstituted aryl radicals, said substitutions being selected from the group consisting of halogen atoms, nitro groups, amino groups, sulfonyl groups, hydroxyl groups and alkyl and alkoxy radicals and wherein R and R' may or may not be the same. An example of such a compound includes 2,2',6,6'-tetraisopropyldiphenylcarbodiimide, a bis-carbodiimide produced by Rhein-Chemie of Rheinan, Germany under the tradename Stabaxol 1. Other carbodiimides include aromatic polycarbodiimldes such as 2,4-diisocyanato- 1,3,5-tris(1-methylethyl) copolymer with 2,6-diisopropyl diisocyanate and benzene- 2,4-diisocyanato-1,3,5-tris(1-methylethyl) homopolymer also produced by Rhein-Chemie under the tradenames Stabaxol P and Stabaxol P100, respectively.

For blends of PPS and PET, the amount of such a hydrolytic stabilizing agent added to the polymer blend ranges from 0 (absent) up to about 5 percent by weight with a corresponding decrease in the content of the PET, although the use of other amounts is not necessarily precluded. For blends of PPS and high temperature polyester, the amount of such a hydrolytic stabilizing agent added to the polymer blend ranges from 0 (absent) up to about 5 percent by weight with a corresponding decrease in the content of the high temperature polyester, although the use of other amounts is not necessarily precluded. For blends of PPS, PET and high temperature polyester, the amount of such a hydrolytic stabilizing agent added to the polymer blend ranges from 0 (absent) up to about 5 percent by weight with a corresponding decrease in the content of the PET or the high temperature polyester, or both, although the use of other amounts is not necessarily precluded. For blends of PPS and PPO, the amount of such a hydrolytic stabilizing agent added to the polymer blend ranges from 0 (absent) up to about 5 percent by weight with a corresponding decrease in the content of the PPO, although the use of other amounts is not necessarily precluded. It will be understood that other compounds may also be employed without departing from the spirit of the invention and that the invention is not necessarily limited to the carbodiimides exemplified. For example, mixtures of these carbodiimides may also be employed.

The foregoing polymer blends or, more appropriately, the polymer pellet mixes are fed into the extruder and are preferably extruded by a process of melt extrusion at temperatures below about 325° C., to produce the improved monofilament of the present invention. More particularly, the extrusion temperature preferably ranges between about 285° C. to 325° C. with a range of about 290° C. to 300° C. being most preferred. The extruder screw conveys the polymer resin mixture forward so that the molten resins are thoroughly blended. The molten material is then fed into a metering pump which forces it through a die to form molten filaments.

After the molten filament exits the die and before it is drawn, the filament strand is quenched in air or in a water bath so that solid filaments are formed. Thereafter, the solid filaments are drawn between a set of rolls to a preferable ratio of from about 3:1 to 6:1. The drawn filaments are preferably allowed to relax from about 0 to 15 percent by passing them through a relaxing stage. The finished filaments are then wound onto spools. Unlike other existing processes for forming PPS/PET blends, which require the blend to be formed first and thereafter melted, extruded and chopped or otherwise molded, the process of the present invention allows the finished product to be made directly from the polymer resin blend in a single step. In addition, unlike other existing processes for forming PPS/PET blends which require additional components to aid in the compatibility of the two components, the process of the present invention allows the two components to be blended and extruded in a single step so that compatibilizers are not necessary but may be included.

It is also noted that for blends of PPS and high temperature polyester or blends of PPS, PET and high temperature polyester, the monofilaments may be formed in the same manner as described hereinabove for the PPS/PET blends using essentially the same temperatures, draw ratios, etc., as provided hereinabove for the PPS/PET blends. The same is true for blends of PPS and PPO.

Unlike the present invention, compatibilizers are necessary when the product being produced from the polymer blend is a molded product. In order for molded products to be useful, they must have uniform properties in three dimensions, and the material employed to form the molded products must be homogeneous. However, when molded products are formed from incompatible blends such as PET and PPS, the material is not homogeneous on a small scale and the blends of these resins exist as multi-phase systems. This results in molded products which are weak and brittle and generally unsuitable for most applications.

Analysis of the filaments of the present invention made from the blends of PPS and at least one of PET and high temperature polyester, indicates that the filament structure appears to be made up of a plurality of individual continuous fibrils comprised primarily of either PPS or PET or high temperature polyester, as applicable. Thus, even though PPS, PET and hitch temperature polyester do not form fully compatible blends, the nature of the filament-forming process is such that discrete volumes of PPS, PET and high temperature polyester in the blend melt are elongated in the direction of the fiber axis during extrusion and form the abovedescribed fibrils. The filaments, thus formed, comprise a plurality of individual, parallel fibrils. Such a structure has good properties in the direction of the filament axis. Properties perpendicular to the filament axis, while not as good as those parallel to the filament axis, are nevertheless adequate for most filament applications. Therefore, for filaments comprising PPS and PET or high temperature polyester, or both, the blend compatibility is not as important as for molded bulk structures which need good properties in three dimensions.

Nevertheless, compatibilizers may be included in some filaments of the present invention. Such compatibilizers may include unsaturated polymers and/or vinyl or allyl compounds containing an epoxy groups as disclosed in Nakata U.S. Pat. No. 4,997,866 and Kubota U.S. Pat. No. 5,218,043, both of which are hereby incorporated by reference for this particular purpose. Where they are used, compatibilizers may be added to the polymer blends in an amount ranging from 0 (absent) up to about 5 percent by weight with a corresponding decrease in the content of the blend or any component.

Monofilaments prepared according to the present invention have been found to have better tensile strength than conventional PPS monofilaments and increased resistance to chemical, hydrolytic and/or thermal degradation as compared to conventional PET monofilaments. Such monofilaments have utility for a variety of industrial applications including the production of paper machine fabrics and belts. A plurality of these monofilaments can be interwoven as is commonly known in the art, and the fabrics produced therefrom exhibit improved chemical, hydrolytic and thermal resistance and improved tensile strength, very useful properness which may substantially add to the operational life of the paper maker fabrics or belts.

Monofilament Examples

In order to demonstrate practice of the invention, physical/chemical properties of three monofilament blends prepared according to the concepts of the present invention were compared to the same properties of a conventional PPS monofilament, a conventional high temperature polyester resin and a conventional PET monofilament.

The filament designated Example 1 in Tables I through III hereinbelow is a PPS monofilament produced by the Shakespeare Company having a diameter of about 0.5 mm. The filament comprises about 98 percent by weight PPS and about 2 percent by weight of a fluoropolymer (ethylene tetrafluoroethylene) available from E.I. du Pont de Nemours & Co. under the tradename TEFZEL 210.

The filament designated Example 2 in Tables I through III and Example 13 in Table IV hereinbelow is a (PCTA) monofilament produced by the Shakespeare Company also having a diameter of about 0.5 mm. This filament comprises a blend of the high temperature polyester resin, KODAR THERMX Copolyester 13319, about 2.5 percent by weight of the thermal stabilizing agent, Thermx 13319-L0001, and about 1.3 percent by weight of the hydrolytic stabilizing agent, 2,2',6,6'-tetraisopropyldiphenyl carbodiimide (Stabaxol 1).

The filament designated Example 3 in Tables I through III and Example 14 in Table IV hereinbelow is a (PET) monofilament produced by the Shakespeare Company also having a diameter of about 0.5 mm. This filament comprises about 99 percent by weight PET having an intrinsic viscosity of about 0.95 and about 1 percent by weight of a carbodimide hydrolysis stabilizer.

The filaments designated Examples 4 through 12 and 15 through 18 in Tables I through IV hereinbelow were produced according to the concepts of the present invention. Specifically, for Example 4, pellets of PPS were mixed with pellets of PET to form a uniform blend such that the weight ratio of PPS to PET was 50/50. This blend was extruded using a single screw extruder (2 inches) having a length to diameter ratio of 24. The extrusion conditions which are not to be considered limiting were as follows:

| | |
|---|---|
| First heater zone | 293° C. (560° F.) |
| Second heater zone | 296° C. (565° F.) |
| Third heater zone | 299° C. (570° F.) |
| Fourth heater zone | 299° C. (570° F.) |
| Fifth heater zone | 296° C. (565° F.) |
| Extruder neck | 296° C. (565° F.) |
| Pump | 293° C. (560° F.) |
| Extruder head | 293° C. (560° F.) |
| Extruder die | 293° C. (560° F.) |

The extruder die had 12, 0.055-inch holes. The extruder output was approximately 35.7 pounds per hour and the final monofilament size was about 0.5 millimeters. The monofilament was quenched in a water bath at a temperature of about 68° C. (155° F.). The die to quench distance was about 2.5 inches. The quenched monofilament was drawn in a heated water bath having a length of about 3 meters at a temperature of about 92° C. (198° F.). The draw ratio was about 3.42. The filament was relaxed at about 149° C. (300° F.) by about 10.9 percent.

For Example 5, pellets of PPS and pellets of PET were mixed to form a uniform blend such that the weight ratio of PPS to PET was 60/40. This blend was extruded in a manner similar to that described in Example 4.

For Example 6, pellets of PPS and PET were mixed and blended such that the ratio by weight of PPS to PET was 70/30. Likewise, this blend was extruded in a manner similar to that described in Example 4.

For Examples 7 and 15, pellets of PPS and pellets of PCTA were mixed to form a uniform blend such that the weight ratio of PPS to PCTA was 60/40. This blend was extruded in a manner similar to that described in Example 4.

For Example 8, pellets of PPS and PCTA were mixed and blended such that the ratio by weight of PPS to PCTA was 70/30. Likewise, this blend was extruded in a manner similar to that described in Example 4.

For Examples 9 and 17, pellets of PPS and pellets of PCTA were mixed to form a uniform blend such that the weight ratio of PPS to PCTA was 40/60. This blend was extruded in a manner similar to that described in Example 4.

For Example 10, pellets of PPS, PET and PCTA were mixed and blended such that the ratio by weight of PPS to PET to PCTA was 60/30/10. Likewise, this blend was extruded in a manner similar to that described in Example 4.

For Examples 11 and 18, pellets of PPS, PET and PCTA were mixed to form a uniform blend such that the weight ratio of PPS to PET to PCTA was 60/20/20. This blend was extruded in a manner similar to that described in Example 4.

For Example 12, pellets of PPS, PET and PCTA were mixed and blended such that the ratio by weight of PPS to PET to PCTA was 60/10/30. This blend was extruded in a manner similar to that described in Example 4.

Finally, for Example 16, pellets of PPS and pellets of PCTA were mixed to form a uniform blend such that the weight ratio of PPS to PCTA was 50/50. Likewise, this blend was extruded in a manner similar to that described in Example 4.

Each of the filaments produced in Examples 1 through 12 was then tested to determine the tensile strength, tenacity, percent elongation at break, loop strength, loop tenacity, abrasion resistance and hydrolysis resistance. Hydrolysis resistance of the filaments was determined by exposing them to water at elevated temperature and pressure. In one case, all of the filaments were exposed to saturated steam at 15 psi and 250° F. 122° C. for various lengths of time. In another case, the filaments in Examples 1 through 12 were exposed to saturated steam at 50 psi and 300° F. (149° C.). In the first case, referred to as long term hydrolysis, the filaments of Examples 4 through 6 were exposed for 2, 6, 8, 10, 13, and 15 days after which they were tested to determine tensile retention. In the second case, referred to as accelerated (22 hr. sequential) hydrolysis, these same filaments were exposed for 3, 5 and 7 days after which they were tested to determine tensile retention. The results of these tests are presented in Table I hereinbelow.

For long term hydrolysis of the filaments in Examples 1 through 3 and 7 through 12, these filaments were exposed for 4, 7, 11 and 14 days after which they were tested to determine tensile retention as measured against no exposure (0 days). In the second case, referred to as accelerated (22 hr. sequential) hydrolysis, these same filaments were exposed for 1, 2 and 3 days after which they were tested to determine tensile retention. The results of these tests are presented in Tables I–III hereinbelow, with actual tensile values reported in pounds.

For Table IV hereinbelow, relating to long term hydrolysis, the filaments in Examples 13 through 18 were exposed for 2, 5, 8, 12, 15, 19, 22, 26 and 30 days after which they were tested to determine tensile retention as measured against no exposure (0 days). This test shows hydrolysis resistance over a significantly longer period of time than is shown in Tables I–III. The results of this test are presented in Table IV hereinbelow, with actual tensile values reported in pounds.

Tensile strength for monofilaments according to the present invention ranges from about 15 to about 18 lbs.

Tenacity for monofilaments according to the present invention ranges from about 2.7 to about 3.3 gm/den.

Percent elongation at break for monofilaments according to the present invention ranges from about 19 to about 43.

Loop strength for monofilament according to the present invention ranges from about 6 to about 19 lbs.

Loop Tenacity for monofilaments according to the present invention ranges from about 1.3 to about 3.6 gm/den.

Abrasion resistance for monofilaments according to the present invention ranges from about 2300 to about 14,000 cycles.

22 hour hydrolysis resistance (percent tensile retained) for monofilaments according to the present invention ranges from about 16 to about 58 percent.

22 hour hydrolysis resistance (actual tensile retained) for monofilaments according to the present invention ranges from about 2.5 to about 15 lbs.

Long term hydrolysis resistance (percent tensile retained) for monofilaments according to the present invention ranges from about 16 to about 100 percent.

Long term hydrolysis resistance (actual tensile retained) for monofilaments according to the present invention ranges from about 3 to about 17 lbs.

TABLE I

COMPARISON OF MONOFILAMENT PROPERTIES - 0.5 MM FILAMENT

| Ex. Nos. | 1 (PPS) | 2 (PCTA) | 3 (PET) | 4 PPS/PET 50/50 | 5 PPS/PET 60/40 | 6 PPS/PET 70/30 |
|---|---|---|---|---|---|---|
| Tensile Strength, lbs. | 15.86 | 14.79 | 24.82 | 16.78 | 17.55 | 15.90 |
| Tenacity, gpd | 2.95 | 3.00 | 4.55 | 3.16 | 3.29 | 3.13 |
| Elongation at Break, % | 37.74 | 25.07 | 33.95 | 42.98 | 40.51 | 36.61 |
| Loop Strength, lbs. | 10.42 | 11.01 | 30.32 | 16.98 | 19.09 | 13.90 |
| Loop Tenacity, gpd | 1.94 | 2.23 | 5.55 | 3.21 | 3.58 | 2.74 |
| Knot Strength, lbs. | 9.86 | 9.82 | 16.86 | 12.13 | 10.96 | 9.82 |
| Knot Tenacity, gpd. | 1.83 | 1.98 | 3.12 | 2.30 | 2.05 | 1.93 |
| Squirrel Cage Abrasion, cycles to failure | 5188 | 4950 | 9158 | 2324 | 2435 | 7571 |
| 22 Hr. Sequential Hydrolysis, % Tensile related after | | | | | | |
| 1 day | 100 | 73 | 69 | — | — | — |
| 2 days | 100 | 62 | 0 | — | — | — |
| 3 days | 100 | 16 | 0 | 16 | 47 | 42 |
| 5 days | — | — | — | 14 | 38 | 40 |
| 7 days | — | — | — | 13 | 36 | 40 |
| 22 Hr. Sequential Hydrolysis, Actual Tensile retained after | | | | | | |
| 1 day | 16.22 | 10.67 | 17.01 | — | — | — |
| 2 days | 16.39 | 9.10 | 0 | — | — | — |
| 3 days | 16.28 | 2.39 | 0 | 2.46 | 7.56 | 6.78 |
| 5 days | — | — | — | 2.09 | 6.06 | 6.51 |
| 7 days | — | — | — | 2.00 | 5.85 | 6.46 |
| Long Term Hydrolysis, % Tensile retained after | | | | | | |
| 0 days | 100 | 100 | 100 | 100 | 100 | 100 |
| 2 days | — | — | — | 96 | 98 | 100 |
| 4 days | 100 | 99 | 100 | — | — | — |
| 6 days | — | — | — | 73 | 35 | 30 |
| 7 days | 100 | 100 | 100 | — | — | — |
| 8 days | — | — | — | 74 | 40 | 33 |
| 10 days | — | — | — | 73 | 36 | 37 |
| 11 days | 100 | 97 | 68 | — | — | — |
| 13 days | — | — | — | 58 | 38 | 35 |
| 14 days | 100 | 100 | 0 | — | — | — |
| 15 days | — | — | — | 61 | 32 | 28 |
| Long Term Hydrolysis, Actual Tensile Strength retained after | | | | | | |
| 0 days | 15.91 | 12.45 | 20.03 | 16.78 | 17.55 | 15.90 |
| 2 days | — | — | — | 16.07 | 17.14 | 16.09 |
| 4 days | 16.69 | 12.31 | 21.28 | — | — | — |
| 6 days | — | — | — | 12.27 | 6.09 | 4.84 |
| 7 days | 16.85 | 12.46 | 20.74 | — | — | — |
| 8 days | — | — | — | 12.35 | 7.07 | 5.30 |
| 10 days | — | — | — | 12.22 | 6.35 | 6.00 |
| 11 days | 16.41 | 12.09 | 13.55 | — | — | — |
| 13 days | — | — | — | 9.77 | 6.67 | 5.63 |
| 14 days | 16.53 | 12.91 | 0 | — | — | — |
| 15 days | — | — | — | 10.22 | 5.53 | 4.52 |

TABLE II

COMPARISON OF MONOFILAMENT PROPERTIES - 0.5 MM FILAMENT

| Ex. Nos. | 1 (PPS) | 2 (PCTA) | 3 (PET) | 7 PPS/PCTA 60/40 | 8 PPS/PCTA 70/30 | 9 PPS/PCTA 40/60 |
|---|---|---|---|---|---|---|
| Tensile Strength, lbs. | 15.86 | 14.79 | 24.82 | 15.23 | 16.12 | 17.14 |
| Tenacity, gpd | 2.95 | 3.00 | 4.55 | 2.85 | 3.08 | 3.32 |
| Elongation at Break, % | 37.74 | 25.07 | 33.95 | 19.63 | 21.37 | 23.49 |
| Loop Strength, lbs. | 10.42 | 11.01 | 30.32 | 9.19 | 9.15 | 6.68 |
| Loop Tenacity, gpd | 1.94 | 2.23 | 5.55 | 1.72 | 1.75 | 1.30 |
| Knot Strength, lbs. | 9.86 | 9.82 | 16.86 | 7.91 | 4.90 | 4.75 |
| Knot Tenacity, gpd. | 1.83 | 1.98 | 3.12 | 1.48 | 0.94 | 0.92 |
| Squirrel Cage Abrasion, cycles to failure | 5188 | 4950 | 9158 | 13605 | 7161 | 8686 |
| 22 Hr. Sequential Hydrolysis, % Tensile related after | | | | | | |
| 1 day | 100 | 73 | 69 | 99 | 92 | 87 |
| 2 days | 100 | 62 | 0 | 95 | 72 | 84 |
| 3 days | 100 | 16 | 0 | 58 | 42 | 26 |
| 22 Hr. Sequential Hydrolysis, actual Tensile retained after | | | | | | |
| 1 day | 16.22 | 10.67 | 17.01 | 15.13 | 14.77 | 14.93 |
| 2 days | 16.39 | 9.10 | 0 | 14.43 | 11.63 | 14.40 |
| 3 days | 16.28 | 2.39 | 0 | 8.83 | 6.88 | 4.37 |
| Long Term Hydrolysis, % Tensile retained after | | | | | | |
| 0 days | 100 | 100 | 100 | 100 | 100 | 100 |
| 4 days | 100 | 99 | 100 | 100 | 100 | 100 |
| 7 days | 100 | 100 | 100 | 100 | 100 | 100 |
| 11 days | 100 | 97 | 68 | 100 | 99 | 94 |
| 14 days | 100 | 100 | 0 | 100 | 100 | 98 |
| Long Term Hydrolysis, actual Tensile Strength retained after | | | | | | |
| 0 days | 15.91 | 12.45 | 20.03 | 14.24 | 13.79 | 12.92 |
| 4 days | 16.69 | 12.31 | 21.28 | 16.29 | 15.04 | 13.67 |
| 7 days | 16.85 | 12.46 | 20.74 | 16.10 | 14.61 | 14.33 |
| 11 days | 16.41 | 12.09 | 13.55 | 14.79 | 13.62 | 12.19 |
| 14 days | 16.53 | 12.91 | 0 | 16.69 | 14.40 | 12.68 |

TABLE III

COMPARISON OF MONOFILAMENT PROPERTIES - 0.5 MM FILAMENT

| Ex. Nos. | 1 (PPS) | 2 (PCTA) | 3 (PET) | 10 PPS/PET/PCTA 60/30/10 | 11 PPS/PET/PCTA 60/20/20 | 12 PPS/PET/PCTA 60/10/30 |
|---|---|---|---|---|---|---|
| Tensile Strength, lbs. | 15.86 | 14.79 | 24.82 | 17.25 | 16.18 | 15.83 |
| Tenacity, gpd | 2.95 | 3.00 | 4.55 | 3.00 | 2.77 | 2.82 |
| Elongation at Break, % | 37.74 | 25.07 | 33.95 | 42.27 | 32.01 | 30.63 |
| Loop Strength, lbs. | 10.42 | 11.01 | 30.32 | 16.91 | 11.83 | 12.86 |
| Loop Tenacity, gpd | 1.94 | 2.23 | 5.55 | 2.94 | 2.03 | 2.29 |
| Knot Strength, lbs. | 9.86 | 9.82 | 16.86 | 11.23 | 9.68 | 9.12 |
| Knot Tenacity, gpd. | 1.83 | 1.98 | 3.12 | 1.95 | 1.66 | 1.62 |
| Squirrel Cage Abrasion, cycles to failure | 5188 | 4950 | 9158 | 6848 | 4608 | 5656 |
| 22 Hr. Sequential Hydrolysis, % Tensile related after | | | | | | |
| 1 day | 100 | 73 | 69 | 30 | 61 | 57 |
| 2 days | 100 | 62 | 0 | 20 | 54 | 45 |
| 3 days | 100 | 16 | 0 | 19 | 49 | 43 |
| 22 Hr. Sequential Hydrolysis, Actual Tensile retained after | | | | | | |
| 1 day | 16.22 | 10.67 | 17.01 | 5.13 | 9.83 | 8.95 |
| 2 days | 16.39 | 9.10 | 0 | 3.46 | 8.77 | 7.14 |

TABLE III-continued

COMPARISON OF MONOFILAMENT PROPERTIES - 0.5 MM FILAMENT

| Ex. Nos. | 1 (PPS) | 2 (PCTA) | 3 (PET) | 10 PPS/PET/PCTA 60/30/10 | 11 PPS/PET/PCTA 60/20/20 | 12 PPS/PET/PCTA 60/10/30 |
|---|---|---|---|---|---|---|
| 3 days | 16.28 | 2.39 | 0 | 3.33 | 7.90 | 6.84 |
| Long Term Hydrolysis, % Tensile retained after | | | | | | |
| 0 days | 100 | 100 | 100 | 100 | 100 | 100 |
| 4 days | 100 | 99 | 100 | 55 | 71 | 80 |
| 7 days | 100 | 100 | 100 | 17 | 58 | 61 |
| 11 days | 100 | 97 | 68 | 18 | 49 | 50 |
| 14 days | 100 | 100 | 0 | 19 | 51 | 43 |
| Long Term Hydrolysis, Actual Tensile Strength retained after | | | | | | |
| 0 days | 15.91 | 12.45 | 20.03 | 15.98 | 16.92 | 16.12 |
| 4 days | 16.69 | 12.31 | 21.28 | 8.78 | 11.95 | 12.94 |
| 7 days | 16.85 | 12.46 | 20.74 | 2.66 | 9.74 | 9.83 |
| 11 days | 16.41 | 12.09 | 13.55 | 2.91 | 8.25 | 8.07 |
| 14 days | 16.53 | 12.91 | 0 | 3.08 | 8.60 | 7.06 |

TABLE IV

COMPARISON OF LONG TERM HYDROLYSIS PROPERTIES - 0.5 MM FILAMENT

| Ex. Nos. | 13 (PCTA) | 14 (PET) | 15 PPS/PCTA 60/40 | 16 PPS/PCTA 50/50 | 17 PPS/PCTA 40/60 | 18 PPS/PET/PCTA 60/20/20 |
|---|---|---|---|---|---|---|
| Long Term Hydrolysis, % Tensile Retained After | | | | | | |
| 0 days | 100 | 100 | 100 | 100 | 100 | 100 |
| 2 days | 96 | 92 | 100 | 100 | 92 | 94 |
| 5 days | 96 | 90 | 100 | 98 | 93 | 93 |
| 8 days | 90 | 81 | 100 | 100 | 97 | 87 |
| 12 days | 92 | 29 | 100 | 93 | 84 | 76 |
| 15 days | 83 | 0 | 100 | 81 | 68 | 74 |
| 19 days | 69 | 0 | 100 | 70 | 55 | 60 |
| 22 days | 60 | 0 | 97 | 69 | 58 | 64 |
| 26 days | 49 | 0 | 70 | 26 | 22 | 59 |
| 30 days | 21 | 0 | 65 | 31 | 16 | 56 |
| Long Term Hydrolysis, Actual Tensile Retained after | | | | | | |
| 0 days | 14.79 | 24.82 | 15.23 | 16.12 | 17.14 | 17.60 |
| 2 days | 14.14 | 22.78 | 15.40 | 16.38 | 15.70 | 16.52 |
| 5 days | 14.24 | 22.44 | 17.61 | 15.83 | 15.90 | 16.32 |
| 8 days | 13.27 | 20.15 | 18.40 | 16.93 | 16.65 | 15.33 |
| 12 days | 13.54 | 7.14 | 17.37 | 14.95 | 14.49 | 13.44 |
| 15 days | 12.21 | 0 | 17.11 | 13.00 | 11.61 | 13.01 |
| 19 days | 10.26 | 0 | 16.12 | 11.24 | 9.37 | 10.56 |
| 22 days | 8.90 | 0 | 14.71 | 11.13 | 10.02 | 11.21 |
| 26 days | 7.18 | 0 | 10.70 | 4.14 | 3.75 | 10.37 |
| 30 days | 3.10 | 0 | 9.93 | 4.95 | 2.66 | 9.88 |

As is apparent from analysis of the results presented in Tables I, II, III and IV the three way blend of PPS, PET and PCTA retains much of the physical strength of the filament made from the PPS/PET blend and much of the hydrolysis resistance of the PPS/PCTA blend.

Next, in order to demonstrate the dry heat stability properties attained via practice of the present invention, three monofilament blends prepared according to the present invention were compared to the same properties of a conventional PPS monofilament, a conventional high temperature polyester resin and a conventional PET monofilament.

The filament designated Example 1 in Tables V through VII hereinbelow is the PPS monofilament produced by the Shakespeare Company having a diameter of about 0.5 mm as described hereinabove. The filament comprises about 98 percent by weight PPS and about 2 percent by weight of a fluoropolymer (ethylene tetrafluoroethylene) available from E.I. du Pont de Nemours & Co. under the tradename TEFZEL 210.

The filament designated Example 2 in Tables V through VII hereinbelow is a (PCTA) monofilament produced by the Shakespeare Company also having a diameter of about 0.5 mm as described hereinabove. This filament comprises a blend of the high temperature polyester resin, KODAR THERMX Copolyester 13319, about 2.5 percent by weight of the thermal stabilizing agent, Thermx 13319-L0001, and about 1.3 percent by weight of the hydrolytic stabilizing agent, 2,2',6,6'-tetraisopropyldiphenyl carbodiimide (Stabaxol 1).

The filament designated Example 3 in Tables V through VII hereinbelow is a (PET) monofilament produced by the Shakespeare Company also having a diameter of about 0.5 mm as described hereinabove. This filament comprises about 99 percent by weight PET having an intrinsic viscosity of about 0.95 and about 1 percent by weight of a carbodimide hydrolysis stabilizer.

The filaments designated Examples 4 through 12 in Tables V through VII hereinbelow were produced according to the present invention. Specifically, Examples 4 through 12 have the same blend composition as Examples 4 through 12 reported hereinabove. These blends were extruded using a single screw extruder (2 inches) having a length to diameter ratio of 24. The extrusion conditions which are not to be considered limiting were as follows:

| | |
|---|---|
| First heater zone | 293° C. (560° F.) |
| Second heater zone | 296° C. (565° F.) |
| Third heater zone | 299° C. (570° F.) |
| Fourth heater zone | 299° C. (570° F.) |
| Fifth heater zone | 296° C. (565° F.) |
| Extruder neck | 296° C. (565° F.) |
| Pump | 293° C. (560° F.) |
| Extruder head | 293° C. (560° F.) |
| Extruder die | 293° C. (560° F.) |

The extruder die had 12, 0.055-inch holes. The extruder output was approximately 35.7 pounds per hour and the final monofilament size was about 0.5 millimeters. The monofilament was quenched in a water bath at a temperature of about 68° C. (155° F.). The die to quench distance was about 2.5 inches. The quenched monofilament was drawn in a heated water bath having a length of about meters at a temperature of about 92° C. (198° F.). The draw ratio was about 3.42. The filament was relaxed at about 149° C. (300° F.) by about 10.9 percent.

Each of the filaments produced in Examples 1 through 12 was then tested to determine the dry heat stability by exposure to dry heat at 177° C. (350° F.) for the number of days indicated in the Tables.

TABLE V

| DRY HEAT STABILITY PROPERTIES - 0.5 MM FILAMENT | | | | | | |
|---|---|---|---|---|---|---|
| | 1 | 2 | 3 | 4 | 5 PPS/PET | 6 |
| Ex. Nos. | (PPS) | (PCTA) | (PET) | 50/50 | 60/40 | 70/30 |
| Long Term Stability % Tensile retained after | | | | | | |
| 0 days | 100 | 100 | 100 | 100 | 100 | 100 |
| 3 days | 100 | 85 | 72 | 98 | — | 100 |
| 4 days | — | — | — | — | 97 | — |
| 5 days | 99 | 83 | 49 | 96 | — | 100 |
| 6 days | — | — | — | — | 75 | — |
| 7 days | 100 | 80 | 44 | 96 | — | 98 |
| 8 days | — | — | — | — | 94 | — |
| 10 days | 100 | 72 | 43 | 91 | — | 96 |
| 11 days | — | — | — | — | 93 | — |
| 12 days | 100 | 69 | 44 | 92 | — | 95 |
| 15 days | 100 | 45 | 41 | 92 | — | 93 |
| 17 days | 100 | 40 | 36 | 88 | — | 95 |
| Long Term Stability actual Tensile Strength retained after | | | | | | |
| 0 days | 15.86 | 14.79 | 24.82 | 16.78 | 15.24 | 15.90 |
| 3 days | 17.00 | 12.60 | 17.82 | 16.50 | — | 16.60 |
| 4 days | — | — | — | — | 14.78 | — |
| 5 days | 15.74 | 12.26 | 12.28 | 16.04 | — | 16.16 |
| 6 days | — | — | — | — | 11.43 | — |
| 7 days | 16.96 | 11.84 | 11.00 | 16.08 | — | 15.60 |
| 8 days | — | — | — | — | 14.33 | — |
| 10 days | 16.70 | 10.60 | 10.60 | 15.20 | — | 15.20 |
| 11 days | — | — | — | — | 14.17 | — |
| 12 days | 17.14 | 10.26 | 10.85 | 15.51 | — | 15.16 |
| 15 days | 16.63 | 6.68 | 10.24 | 15.36 | — | 14.77 |
| 17 days | 17.68 | 5.87 | 8.87 | 14.78 | — | 15.14 |

TABLE VI

DRY HEAT STABILITY PROPERTIES - 0.5 MM FILAMENT

| Ex. Nos. | 1 (PPS) | 2 (PCTA) | 3 (PET) | 7 PPS/PCTA 60/40 | 8 PPS/PCTA 50/50 | 9 PPS/PCTA 40/60 |
|---|---|---|---|---|---|---|
| Long Term Stability % Tensile retained after | | | | | | |
| 0 days | 100 | 100 | 100 | 100 | 100 | 100 |
| 3 days | 100 | 85 | 72 | 100 | 100 | 94 |
| 5 days | 99 | 83 | 49 | — | — | — |
| 6 days | — | — | — | 100 | 100 | 93 |
| 7 days | 100 | 80 | 44 | — | — | — |
| 8 days | — | — | — | 100 | 100 | 89 |
| 10 days | 100 | 72 | 43 | 100 | 100 | 90 |
| 12 days | 100 | 69 | 44 | — | — | — |
| 13 days | — | — | — | 100 | 92 | 82 |
| 15 days | 100 | 45 | 41 | 100 | 93 | 81 |
| 17 days | 100 | 40 | 36 | — | — | — |
| Long Term Stability actual Tensile Strength retained after | | | | | | |
| 0 days | 15.86 | 14.79 | 24.82 | 15.23 | 16.12 | 17.14 |
| 3 days | 17.00 | 12.60 | 17.82 | 17.90 | 16.60 | 16.29 |
| 5 days | 15.74 | 12.26 | 12.28 | — | — | — |
| 6 days | — | — | — | 17.57 | 16.91 | 16.24 |
| 7 days | 16.96 | 11.84 | 11.00 | — | — | — |
| 8 days | — | — | — | 17.51 | 16.26 | 15.42 |
| 10 days | 16.70 | 10.60 | 10.60 | 17.70 | 16.19 | 15.66 |
| 12 days | 17.14 | 10.26 | 10.85 | — | — | — |
| 13 days | — | — | — | 17.59 | 14.89 | 14.27 |
| 15 days | 16.63 | 6.68 | 10.24 | 17.44 | 14.92 | 14.05 |
| 17 days | 17.68 | 5.87 | 8.87 | — | — | — |

TABLE VII

DRY HEAT STABILITY PROPERTIES - 0.5 MM FILAMENT

| Ex. Nos. | 1 (PPS) | 2 (PCTA) | 3 (PET) | 10 PPS/PET/PCTA 60/30/10 | 11 PPS/PET/PCTA 60/20/20 | 12 PPS/PET/PCTA 60/10/30 |
|---|---|---|---|---|---|---|
| Long Term Stability % Tensile retained after | | | | | | |
| 0 days | 100 | 100 | 100 | 100 | 100 | 100 |
| 3 days | 100 | 85 | 72 | 88 | 92 | 100 |
| 5 days | 99 | 83 | 49 | 83 | 91 | 95 |
| 7 days | 100 | 80 | 44 | 74 | 88 | 94 |
| 10 days | 100 | 72 | 43 | 82 | 90 | 97 |
| 12 days | 100 | 69 | 44 | 76 | 90 | 97 |
| 15 days | 100 | 45 | 41 | 74 | 89 | 99 |
| 17 days | 100 | 40 | 36 | 74 | 93 | 97 |
| Long Term Stability actual Tensile Strength retained after | | | | | | |
| 0 days | 15.86 | 14.79 | 24.82 | 17.25 | 17.60 | 15.83 |
| 3 days | 17.00 | 12.60 | 17.82 | 15.10 | 16.16 | 16.24 |
| 5 days | 15.74 | 12.26 | 12.28 | 14.40 | 15.96 | 15.02 |
| 7 days | 16.96 | 11.84 | 11.00 | 12.76 | 15.46 | 14.94 |
| 10 days | 16.70 | 10.60 | 10.60 | 14.20 | 15.78 | 15.36 |
| 12 days | 17.14 | 10.26 | 10.85 | 13.06 | 15.83 | 15.41 |
| 15 days | 16.63 | 6.68 | 10.24 | 12.70 | 15.68 | 15.64 |
| 17 days | 17.68 | 5.87 | 8.87 | 12.75 | 16.45 | 15.34 |

As is apparent from analysis of the results presented in Tables V through VII, the two way blend of PPS and PET and the three way blend of PPS, PET and PCTA generally exhibited better dry heat stablity than the filaments made from the PCTA, and PET resins of Examples 2 and 3.

Thus it should be evident from the foregoing examples and specification that the monofilaments of the present invention prepared from a blends of PPS and PET; of PPS and high temperature polyester and of PPS, PET and high temperature polyester have substantially improved thermal, chemical, and hydrolytic resistance, as compared to those conventional monofilaments consisting essentially of PET or high temperature polyester, and have substantially improved tensile strengths as compared to those conventional monofilaments consisting essentially of PPS. While blends of PPS and PET have been made heretofore, these blends have included compatibilizers or other fillers in order to achieve acceptable properties for molded product, inasmuch as PPS and PET are essentially incompatible. Thus, the monofilaments of the present invention are particularly unique in that they may be devoid of such compatibilizers and/or fillers. The monofilaments of the present invention are particularly suited for use in paper machine fabrics, but are not necessarily limited thereto. The filaments and method of the present invention can be used separately with other applications, equipment, methods and the like, as well as for the manufacture of other fabric materials.

Similarly, practice of the process of the present invention should not necessarily be limited to the use of a particular extruder, extrusion temperatures, quench temperatures, draw ratio, relaxation ratio or the like that may be employed to extrude the monofilament. It should be understood that accommodations for differences in equipment, the size and shape of the monofilament, and other physical characteristics of the monofilament of the present invention other than those expressly noted herein as relevant to this disclosure, can readily be made within the spirit of the invention.

It will also be appreciated that the monofilaments described herein have utility in woven fabrics such as is useful as paper machine fabric. The fabric woven from monofilaments will understandably exhibit longer life as compared to conventional "pure" PET or high temperature polyester monofilaments in light of the improved properties of the monofilament.

Based upon the foregoing disclosure, it should now be apparent that the monofilaments and fabrics described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

What is claimed is:

1. A fabric for use in paper-making machines and the like comprising:
a plurality of woven monofilaments, said monofilaments comprising a blend of polyphenylene sulfide and at least one other polymer selected from the group consisting of polyethylene terephthalate and a high temperature polyester resin.

2. A fabric, as set forth in claim 1, wherein said blend comprises from about 50 to 80 percent by weight polyphenylene sulfide and from about 20 to 50 percent by weight polyethylene terephthalate and up to 5 percent by weight of a hydrolytic stabilizing agent, with a corresponding decrease in the weight percent of said polyethylene terephthalate when said hydrolytic stabilizing agent is added, to total 100 percent by weight of said blend.

3. A fabric, as set forth in claim 2, wherein said polymer blend is melt extruded at a temperature below about 325° C.

4. A fabric, as set forth in claim 2, wherein said hydrolytic stabilizing agent is a carbodiimide selected from the group consisting of bis-carbodiimides and polycarbodiimides.

5. A fabric, as set forth in claim 2, wherein said carbodiimide is selected from the group consisting of benzene-2, 4-diisocyanato-1,3,5-tris(1-methylethyl) homopolymer, 2,2',6,6'-tetraisopropyldiphenyl carbodiimide, and a 2,4-diisocyanato-1,3,5-tris(1-methylethyl) copolymer with 2,6-diisopropyl diisocyanate.

6. A fabric, as set froth in claim 1, wherein said blend comprises from about 40 to 80 percent by weight polyphenylene sulfide and from about 20 to 60 percent by weight of said high temperature polyester resin and up to 5 percent by weight of a hydrolytic stabilizing agent, with a corresponding decrease in the weight percent of said high temperature polyester resin when said hydrolytic stabilizing agent is added to total 100 percent by weight of said blend.

7. A fabric, as set forth in claim 6, wherein said high temperature polyester resin is formed by the reaction of two bifunctional acids and one bifunctional alcohol.

8. A fabric, as set forth in claim 7, wherein said bifunctional acids include terephthalic acid and isophthalic acid, and said bifunctional alcohol is selected from the group consisting of ethylene glycol and cyclohaxanedimethanol.

9. A fabric, as set forth in claim 6, wherein said high temperature polyester resin is selected from the group consisting of poly(cyclohexane dimethylene terephthalate/isophthalate) and poly(cyclohexane dimethylene terephthalate).

10. A fabric, as set forth in claim 6, wherein said polymer blend is melt extruded at a temperature below about 325° C.

11. A fabric, as set forth in claim 6, wherein said hydrolytic stabilizing agent is a carbodiimide selected from the group consisting of bis-carbodiimides and polycarbodiimides.

12. A fabric, as set forth in claim 11, wherein said carbodiimide is selected from the group consisting of benzene-2,4-diisocyanato-1,3,5-tris(1-methylethyl) homopolymer, 2,2',6,6'-tetraisopropyldiphenyl carbodiimide, and a 2,4-diisocyanato-1,3,5-tris(1-methylethyl) copolymer with 2,6-diisopropyl diisocyanate.

13. A fabric, as set forth in claim 1, wherein said blend comprises from about 20 to 80 percent by weight polyphenylene sulfide, from about 10 to 50 percent by weight polyethylene terephthalate, from about 10 to 60 percent by weight of said high temperature polyester resin and up to 5 percent by weight of a hydrolytic stabilizing agent, with a corresponding decrease in the weight percent of one of said polyethylene terephthalate or said high temperature polyester resin when said hydrolytic stabilizing agent is added, to total 100 percent by weight of said blend.

14. A fabric, as set forth in claim 13, wherein said high temperature polyester resin is formed by the reaction of two bifunctional acids and one bifunctional alcohol.

15. A fabric, as set forth in claim 14, wherein said bifunctional acids include terephthalic acid and isophthalic acid, and said bifunctional alcohol is selected from the group consisting of ethylene glycol and cydohexanedimethanol.

16. A fabric, as set forth in claim 13, wherein said high temperature polyester resin is selected from the group consisting of poly(cyclohexane dimethylene terephthalate/isophthalate) and poly(cyclohexane dimethylene terephthalate).

17. A fabric, as set forth in claim 13, wherein said polymer blend is melt extruded at a temperature below about 325° C.

18. A fabric, as set forth in claim 13, wherein said hydrolytic stabilizing agent is a carbodiimide selected from the group consisting of bis-carbodiimides and polycarbodiimides.

19. A fabric, as set forth in claim 18, wherein said carbodiimide is selected from the group consisting of benzene-2,4-diisocyanato-1,3,5-tris(1-methylethyl) homopolymer, 2,2',6,6'-tetraisopropyldiphenyl carbodiimide, and a 2,4-diisocyanato-1,3,5-tris(1-methylethyl) copolymer with 2,6-diisopropyl diisocyanate.

20. A fabric, as set forth in claim 6, wherein said high temperature polyester resin is formed by the reaction of one bifunctional acid and two bifunctional alcohols.

21. A fabric, as set forth in claim 13, wherein said high temperature polyester resin is formed by the reaction of one bifunctional acid and two bifunctional alcohols.

* * * * *